United States Patent
Tsirkin et al.

(10) Patent No.: US 9,778,943 B2
(45) Date of Patent: Oct. 3, 2017

(54) TIMER BASED VIRTUAL PROCESSOR SCHEDULING AND SUSPENSION ON PHYSICAL PROCESSOR FOR USE OF PHYSICAL PROCESSOR BY OTHER PROCESSING

(71) Applicant: Red Hat Israel, Ltd., Raanana (IL)

(72) Inventors: Michael Tsirkin, Yokneam Yillit (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 487 days.

(21) Appl. No.: 13/903,561

(22) Filed: May 28, 2013

(65) Prior Publication Data

US 2014/0359608 A1 Dec. 4, 2014

(51) Int. Cl.
G06F 9/46 (2006.01)
G06F 9/455 (2006.01)
G06F 9/48 (2006.01)

(52) U.S. Cl.
CPC .......... *G06F 9/45533* (2013.01); *G06F 9/485* (2013.01)

(58) Field of Classification Search
None
See application file for complete search history.

(56) References Cited

U.S. PATENT DOCUMENTS

| 5,530,860 | A | 6/1996 | Matsuura | |
|---|---|---|---|---|
| 7,475,002 | B1 | 1/2009 | Mann | |
| 7,945,908 | B1 | 5/2011 | Waldspurger et al. | |
| 8,296,767 | B1 * | 10/2012 | Waldspurger et al. | 718/102 |
| 8,364,997 | B2 * | 1/2013 | Tian et al. | 713/322 |
| 8,752,058 | B1 * | 6/2014 | Zheng et al. | 718/102 |
| 2005/0081199 | A1 * | 4/2005 | Traut | G06F 9/45558 718/1 |
| 2005/0108711 | A1 * | 5/2005 | Arnold | G06F 9/3851 718/100 |
| 2007/0033589 | A1 * | 2/2007 | Nicholas et al. | 718/1 |
| 2008/0133846 | A1 * | 6/2008 | Brenner | G06F 9/4881 711/153 |
| 2009/0157936 | A1 * | 6/2009 | Goss et al. | 710/264 |
| 2010/0138208 | A1 | 6/2010 | Hattori et al. | |
| 2011/0202699 | A1 * | 8/2011 | van Riel | G06F 9/4812 710/267 |

(Continued)

FOREIGN PATENT DOCUMENTS

JP 60031649 2/1985

OTHER PUBLICATIONS

Danish, M., et al., "Virtual-CPU Scheduling in the Quest Operating System", RTAS '11 Proceedings of the 2011 17th IEEE Real-Time and Embedded Technology and Applications Symposium, 2011.

*Primary Examiner* — Bradley Teets
(74) *Attorney, Agent, or Firm* — Lowenstein Sandler LLP (57) ABSTRACT

Systems and methods for timer-based virtual processor scheduling. An example method may comprise: selecting, by a hypervisor executing on a computer system, an active virtual processor among two or more virtual processors; determining a first time period being less than a second time period, the second time period equal to a time remaining till a next scheduled timer interrupt of a timer communicatively coupled to the active virtual processor; and suspending the active virtual processor for at least the first time period.

8 Claims, 5 Drawing Sheets

(56) References Cited

U.S. PATENT DOCUMENTS

| | | | |
|---|---|---|---|
| 2011/0225591 A1* | 9/2011 | Wada | G06F 9/45533 718/103 |
| 2012/0174098 A1 | 7/2012 | Tanikawa et al. | |
| 2012/0216193 A1 | 8/2012 | Lee et al. | |
| 2013/0007323 A1* | 1/2013 | Arges | G06F 9/5077 710/200 |
| 2013/0055206 A1* | 2/2013 | Dudek | G06F 9/45558 717/124 |
| 2014/0173597 A1* | 6/2014 | Anand et al. | 718/1 |

* cited by examiner

Tcur
Current
time

Ts = (Tint − Tcur) / N
Virtual processor
suspension period

Tint
Next
scheduled timer
interrupt

Fig. 3a

Tcur
Current
time

Ts = Tint − k
Virtual processor
suspension period

Tint
Next
scheduled timer
interrupt

TIMER BASED VIRTUAL PROCESSOR SCHEDULING AND SUSPENSION ON PHYSICAL PROCESSOR FOR USE OF PHYSICAL PROCESSOR BY OTHER PROCESSING

TECHNICAL FIELD

The present disclosure is generally related to virtualized computer systems, and is more specifically related to systems and methods for virtual processor scheduling.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for timer-based virtual processor scheduling. "Physical processor" or "processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Virtual processor" herein shall refer to abstraction of a processor presented by a hypervisor to a virtual machine, by scheduling time slots (also referred to as processor time slices) on one or more physical processors so that from the guest operating system's perspective those time slots may be consumed as if they were scheduled on a processor "owned" by the guest operating system. In certain implementations, a virtual processor may be implemented as a process running on the host computer system, and the allocation of virtual processors may be controlled by various resource managers, such as, for example, Linux cgroups.

The host computer system may implement various scheduling strategies. In one example, the host computer system may implement a proportional share scheduling method by allocating processor time slices in proportion to the shares (weights) assigned to a virtual machine or a virtual processor. In another example, the host computer system may implement a fair-share scheduling method by implementing a time-averaged form of the proportional sharing.

In another aspect, the host computer system may implement a work-conserving scheduling method or a non-work-conserving scheduling method. In the work-conserving mode, a physical processor may only be idle if there are no active virtual processors ready to be scheduled. For example, if there are two virtual processors with equal weights and one of them is blocked, the other virtual processor may consume the entire physical processor. Conversely, in the non-work-conserving mode, the shares cap the fractions of physical processor time slices owned by virtual processors: in the example of two virtual processors with equal weights, each will get up to 50% of the physical processor time slices, but will not be able to get more than 50% even if the physical processor is idle.

In a further aspect, the host computer system may implement a preemptive or a non-preemptive scheduling method. A preemptive scheduling method may re-calculate the processor allocation whenever a new virtual processor comes online, so that if the new virtual processor has priority over a running virtual processor, the scheduler would preempt the running virtual processor in favor of the new virtual processor. Conversely, a non-preemptive scheduling method may only make scheduling decisions when the allocated processors slices have been fully consumed by a running virtual processor or when the running virtual processor yields the processor.

As the above referenced scheduling methods are agnostic of timer interrupts processed by the virtual processors being scheduled, the virtual machine's real time clock based on timer interrupts may get skewed. To prevent this and other possible adverse consequences of the virtual processor scheduling being timer-agnostic, in certain implementations, the scheduler may implement a scheduling method which involves suspending a preempted or yielding virtual processor for a time period being less than the time remaining until the next scheduled timer interrupt, so that the virtual processor will be running at the time of the next scheduled timer interrupt.

Various aspects of the above referenced methods and systems are described in details herein below by way of examples, rather than by way of limitation.

Figure 1:
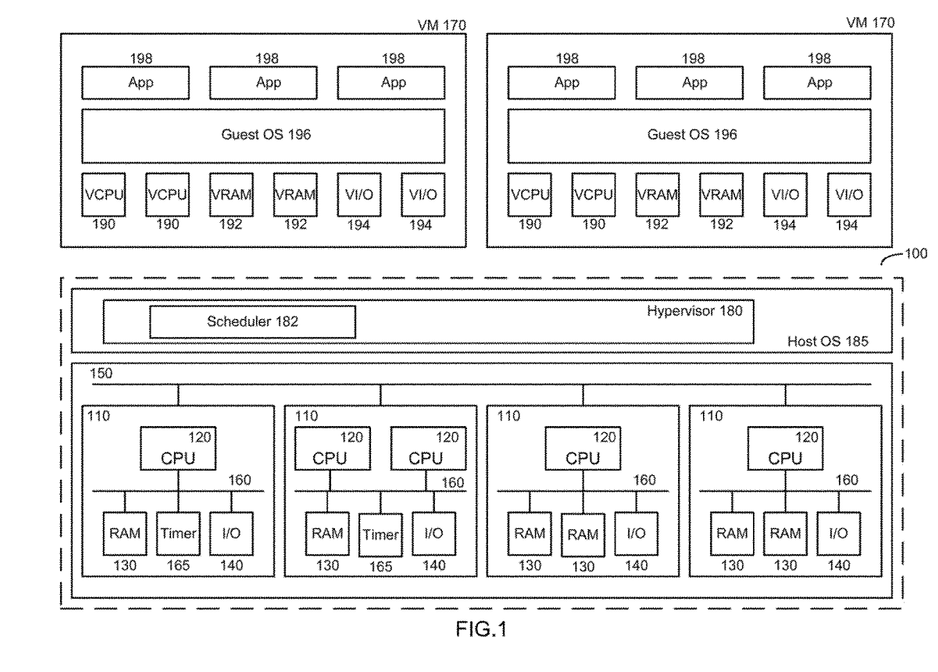
FIG. 1 depicts a high-level component diagram of one illustrative example of a host computer system in accordance with one or more aspects of the present disclosure.

FIG. 1 depicts a high-level component diagram of one illustrative example of a multi-processor computer system 100 in accordance with one or more aspects of the present disclosure. The computer system 100 may include one or more interconnected nodes 110. Each node 110 may in turn include one or more physical processors 120 communicatively coupled to memory devices 130 and input/output (I/O) devices 140.

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect to a system area network 150, as shown in FIG. 1. Local connections within each node 110, including the connections between a processor 120 and a memory 130 and between a processor 120 and an I/O device 140 may be provided by one or more local buses 160 of suitable architecture.

Figure 2:
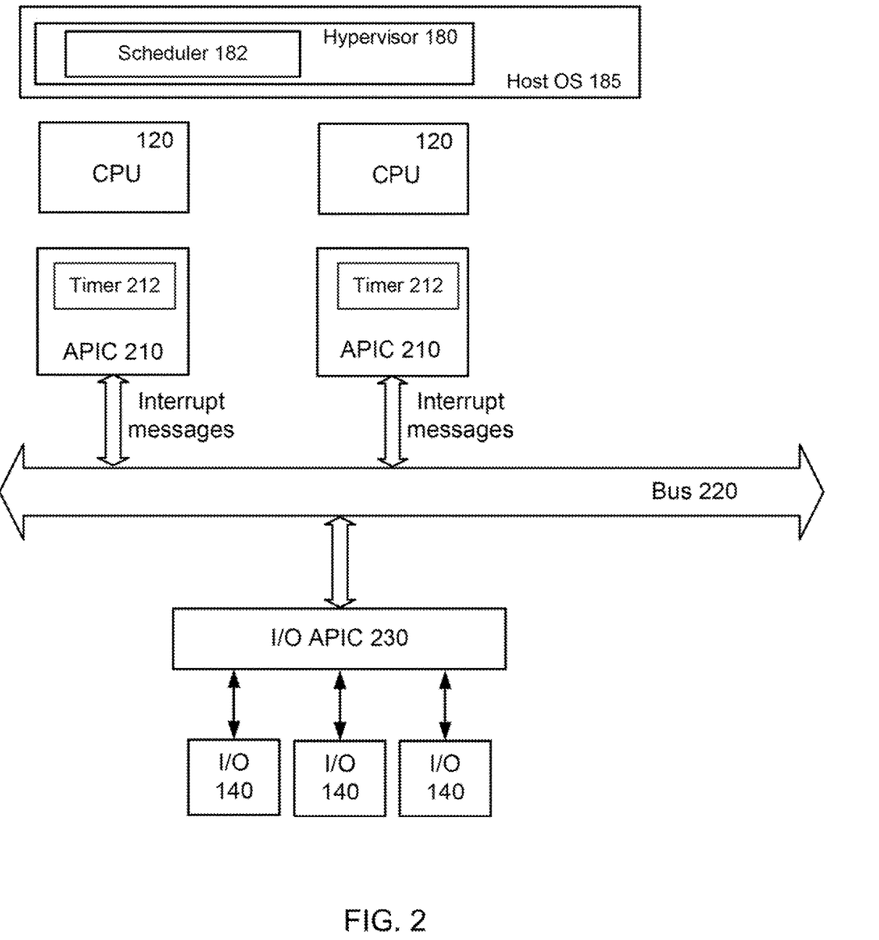
FIG. 2 schematically illustrates interrupt handling components of the host computer system 100 of FIG. 1, in accordance with one or more aspects of the present disclosure FIGS. 3a and 3b schematically illustrate example methods of selecting a time period to suspend a virtual processor, in accordance with one or more aspects of the present disclosure.

The computer system 100 may comprise one or more timers for measuring time periods. In one example, the computer system 100 may comprise one or more programmable timers 165 communicatively coupled to a processor 120 via a local bus 160. In another example, one or more programmable timers may be incorporated into an interrupt controller, such as Advanced Programmable Interrupt Controllers (APIC). In one illustrative example, the computer system 100 may comprise two or more interrupt controllers, including one local APIC per processor and one or more input/output (I/O) APICs connected to I/O devices, as schematically illustrated by FIG. 2. An APIC may be integrated within a processor or may be provided by a separate component. "Interrupt" herein shall refer to an event that requires a processor to execute event-specific instructions, which might involve the processor's holding the current thread of execution and/or switching contexts.

The local APIC may receive interrupts from local sources (including APIC timer interrupts, APIC internal error interrupts, performance monitoring counter interrupts, thermal sensor interrupts, and I/O devices connected to the processor's local interrupt pins either directly or via an external interrupt controller) and externally connected I/O devices (i I/O devices connected to an I/O APIC, including, for example, one or more programmable timers), as well as inter-processor interrupts (IPIs). The latter may be used for software self-interrupts, interrupt forwarding or preemptive scheduling. The local APIC may handle interrupt from externally connected I/O devices by the IPI message handling mechanism.

FIG. 2 schematically illustrates interrupt handling components of a multi-processor computer system. Each processor 120 may be communicatively coupled to a local APIC 210 which may be integrated within a processor or may be provided by a separate component. Local APICs 210 may be connected to a bus 220 which may be provided by a system bus or APIC bus, depending upon the processor model. Also connected to the bus 220 may be one or more I/O APICs 230. One or more external devices 140, such as programmable timers, may be connected to each of the I/O APICS 230.

The local APIC 210 may comprise a programmable timer 212 available to the software executed by the processor. The timer may be programmed to send a local interrupt to its associated processor when a programmed count is reached. In certain implementations, the timer may be programmed through one or more registers for one-shot or periodic operation. In the one-shot mode, the timer may be started by programming in initial count register, which may cause copying the initial count value into a current count register, thus initiating a count-down. When the count-down reaches zero, a timer interrupt may be generated and the current count may remain at the zero value until the timer is reprogrammed. In the periodic mode, the current count register may automatically be reloaded from the initial count register when the count reaches zero and a timer interrupt is generated, and hence the count-down may be repeated. An operating system can implement a real-time clock using a method referred to as "tick counting," by programming a periodic timer interrupt and incrementing the current time by the period of the interrupt every time an interrupt is received. Alternatively, an operating system may employ aperiodic, rather than periodic, programmable timer interrupts. Some operating systems use aperiodic local APIC timer interrupts.

Referring again to FIG. 1, the computer system 100 may run multiple virtual machines 170, by executing a software layer 180, often referred to as "hypervisor," above the hardware and below the virtual machines, as schematically shown in FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, and virtual I/O devices 194.

A virtual machine 170 may execute a guest operating system 196 which may utilize the underlying virtual devices 190, 192, and 194, each of which may map to a device of the host machine (e.g., a network interface device, a CD-ROM drive, etc.). One or more applications 198 may be running on a virtual machine 170 under the guest operating system 196.

A virtual machine 170 may include multiple virtual processors 190. Processor virtualization may be implemented by the hypervisor 180 scheduling time slots on one or more physical processors 120 such that from the guest operating system's perspective those time slots are scheduled on a virtual processor 190. In certain implementations, a virtual processor may be implemented as a process running on the host computer system, and the allocation of virtual processors may be controlled by various resource managers, such as, for example, Linux cgroups. In certain implementations, the hypervisor 180 may include a scheduler 182 designed to implement one or more virtual processor scheduling methods, as described in more details herein below.

In certain implementations, a virtual processor may be in one of the several defined scheduling states, including, e.g., Ready, Running, Waiting, and/or Suspended states. A virtual processor may be in Ready state if the virtual processor is ready to run, however, it has not been scheduled to run. A Ready virtual processor may transition into Running state upon being scheduled to executed on a physical processor. A virtual processor may be in Running state if the virtual processor actively consumes processor cycles of a physical processor. A Running virtual processor may transition into Waiting state, e.g., responsive to executing a HLT instruction, a privileged instruction, a timer interrupt, or an external interrupt. A Running virtual processor may transition into Suspended state, e.g., by having been stopped on a guest instruction boundary by the scheduler. In certain implementations, a Ready, Running, or Waiting virtual processor may be referred to as an "active" virtual processor.

The host computer system may implement various scheduling strategies. In one example, the host computer system may implement a proportional share scheduling method by allocating CPU time slices in proportion to the weights assigned to a virtual machine or a virtual CPU. In another example, the host computer system may implement a fair-share scheduling method by implementing a time-averaged form of the proportional sharing.

In another aspect, the host computer system may implement a preemptive or a non-preemptive scheduling method. A preemptive scheduling method may re-calculate the processor allocation whenever a new virtual processor comes online, so that if the new virtual processor has priority over a running virtual processor, the scheduler would preempt the running virtual processor in favor of the new virtual processor. Conversely, a non-preemptive scheduling method may only make scheduling decisions when the allocated processors slices have been fully consumed by a running virtual processor or when the running virtual processor yields the processor.

As the above referenced scheduling methods are agnostic of timer interrupts processed by the virtual processors being scheduled, the virtual machine's real time clock based on timer interrupts may get skewed. To prevent this and other possible adverse consequences of the virtual processor scheduling being timer-agnostic, in certain implementations, the scheduler may implement a scheduling method which involves suspending a preempted or yielding virtual processor for a time period being less than the time remaining until the next scheduled timer interrupt, so that the virtual processor will be running at the time of the next scheduled timer interrupt, as schematically illustrated by FIGS. 3a-3b.

Figure 3A:
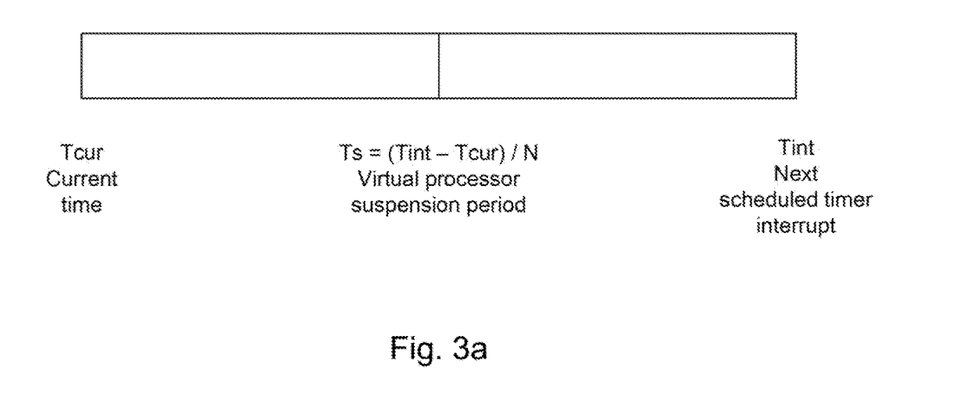
Figure 3B:
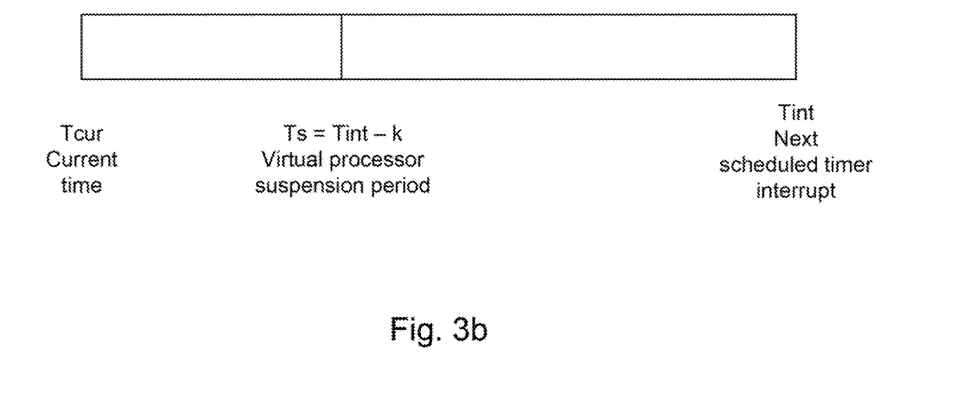

In one example, as schematically illustrated by FIG. 3a, the time period to suspend the virtual processor may be calculated as a fraction of the time remaining until the next scheduled timer interrupt, e.g., by dividing the time remaining until the next scheduled timer interrupt by a positive integer:

$$T_s = (T_{int} - T_{cur})/N,$$

wherein $T_s$ is the time period to suspend the virtual processor for, calculated, e.g., in timer ticks, $T_{int}$ is the time of the next scheduled timer interrupt, $T_{cur}$ is the current time, and N is a positive integer$>=2$.

In another example, as schematically illustrated by FIG. 3b, the time period to suspend the virtual processor may be calculated as a portion of the time remaining until the next scheduled timer interrupt, e.g., by subtracting a positive integer from the time remaining until the next scheduled timer interrupt:

$$T_s = (T_{int} - k),$$

wherein k is a positive integer$>=1$.

Figure 4:
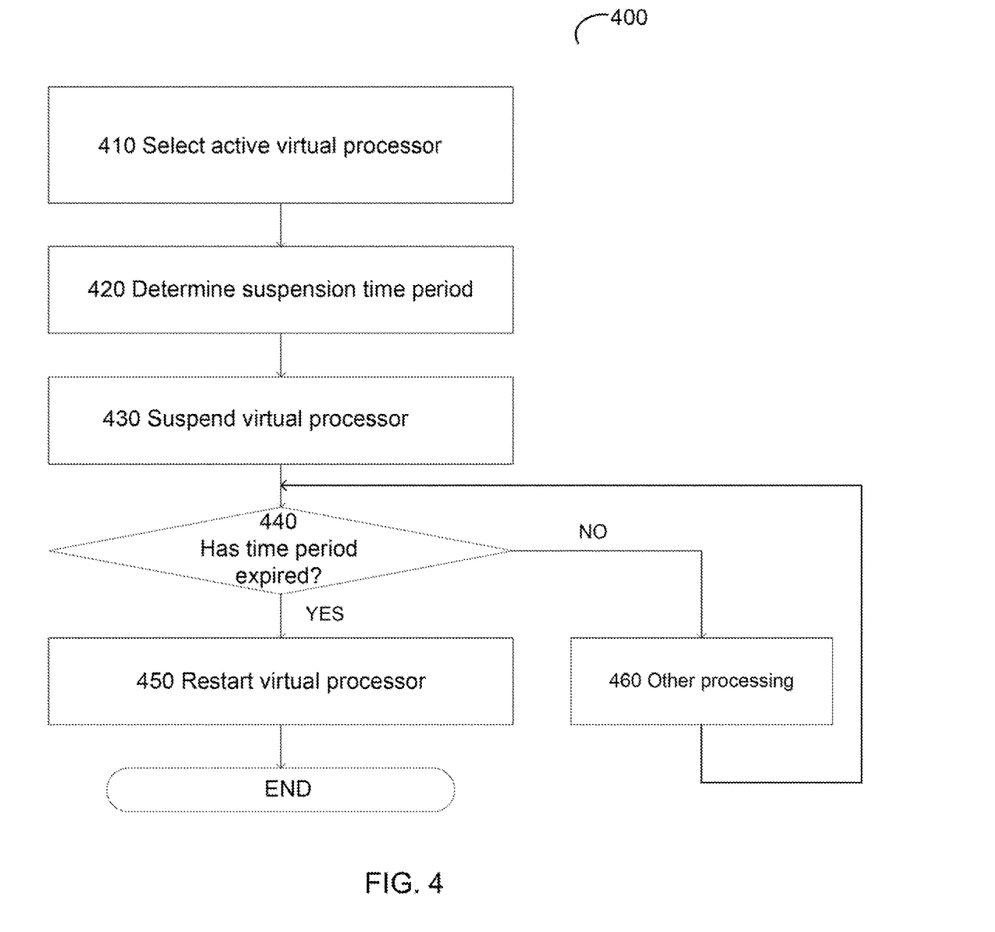
FIG. 4 depicts a flow diagram of a method for timer-based virtual processor scheduling in accordance with one or more aspects of the present disclosure.

FIG. 4 depicts a flow diagram of one illustrative example of a method 400 for timer-based virtual processor scheduling. The method 400 may be performed by a computer system that may comprise hardware (e.g., circuitry, dedicated logic, and/or programmable logic), software (e.g., instructions executable on a computer system to perform hardware simulation), or a combination thereof. The method 400 and/or each of its individual functions, routines, subroutines, or operations may be performed by one or more physical processors of the computer system executing the method.

At block 410, the hypervisor being executed by a host computer system may select an active virtual processor among two or more virtual processors, in accordance to a preemptive or non-preemptive scheduling method implemented by the hypervisor, as described herein above. An active virtual processor may be represented by a ready virtual processor, a running virtual processor, or a waiting virtual processor. In certain implementations, selecting an active virtual processor may involve preempting a running virtual processor.

At block 420, the hypervisor may determine a time period being less than a time remaining till a next scheduled timer interrupt of a timer communicatively coupled to the active virtual processor. As noted herein above, the time period to suspend the virtual processor may be calculated, in one example, as a fraction of the time remaining until the next scheduled timer interrupt, e.g., by dividing the time remaining until the next scheduled timer interrupt by a positive integer. In another example, the time period may be calculated as a portion of the time remaining until the next scheduled timer interrupt, e.g., by subtracting a positive integer from the time remaining until the next scheduled timer interrupt.

In another aspect, the time period may be calculated taking into account the processor shares assigned to two or more virtual processors. In one example, the time period to suspend the virtual processor may be selected in reverse proportion to the virtual processor share. In another example, the time period to suspend the virtual processor may be selected so that the amount of processor time slices, averaged over a period of time, consumed by each of two or more virtual processor would be proportional to the respective virtual processor shares (weights).

At block 430, the hypervisor may suspend the active virtual processor for at least the calculated time period.

Responsive to establishing, at block 440, that the calculated time period has expired, the hypervisor may, at step 450, restart the suspended virtual processor. Upon completing the operations schematically described by block 450, the method may terminate.

Figure 5:
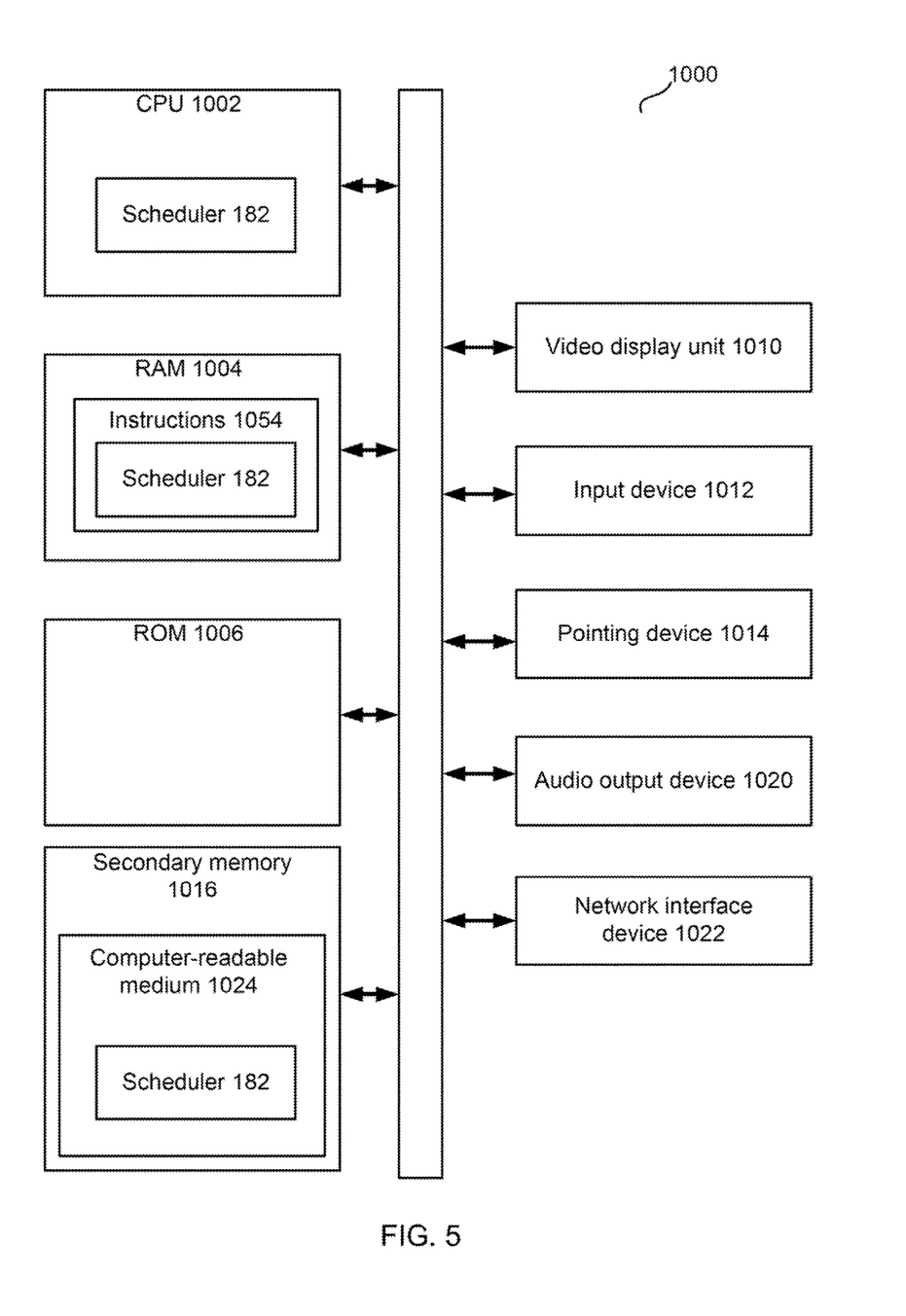
FIG. 5 depicts a block diagram of an illustrative computer system operating in accordance with examples of the present disclosure.

FIG. 5 depicts an example computer system 1000 within which a set of instructions, for causing the computer system to perform any one or more of the methods described herein, may be executed. In certain implementations, computer system 1000 may correspond to host computer system 100 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the virtual processor scheduler 182. Instructions of the virtual processor scheduler 182 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative example as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

The invention claimed is:

1. A method, comprising:
   identifying, by a hypervisor executed by a physical processor, a first virtual processor of a virtual machine executed on the physical processor;
   determining, by the hypervisor, a first amount of time remaining until a next scheduled interrupt of a timer communicatively coupled to the physical processor, wherein the first amount of time corresponds to a first share of the physical processor by the first virtual processor and the interrupt of the timer corresponds to a start of a second share of the physical processor by a second virtual processor of the virtual machine;
   determining, by the hypervisor, a second amount of time for suspending the first virtual processor that is less than the first amount of time remaining until the next scheduled timer interrupt of the timer, wherein the second amount of time is calculated as a difference of the first amount of time and a current time divided by a positive integer;
   suspending, by the hypervisor, the first virtual processor for the second amount of time;
   performing, by the physical processor, operations not associated with the first virtual processor until the first virtual processor is re-started;
   re-starting, by the hypervisor, the suspended fir virtual processor after the second amount of time has elapsed and prior to the next scheduled interrupt of the timer;
   generating, by the timer, the next scheduled interrupt of the timer;
   identifying, by the hypervisor, the next scheduled interrupt of the timer;
   in response to identifying the next scheduled interrupt of the timer, suspending the first virtual processor; and starting, by the hypervisor, execution of the second virtual processor on the physical processor.

2. The method of claim 1, wherein the first virtual processor, when active, is one of a ready virtual processor, a running virtual processor, or a waiting virtual processor.

3. A system comprising
a memory to store a virtual machine; and
a physical processor, operatively coupled to the memory, to:
identify, by a hypervisor executed by the physical processor, a first virtual processor of a virtual machine executed on the physical processor;
determine, by the hypervisor, a first amount of time remaining until a next scheduled interrupt of a timer communicatively coupled to the physical processor, wherein the first amount of time corresponds to a first share of the physical processor by the first virtual processor and the interrupt of the timer corresponds to a start of a second share of the physical processor by a second virtual processor of the virtual machine;
determine, by the hypervisor, a second amount of time for suspending the first virtual processor that is less than the first amount of time remaining until the next scheduled timer interrupt of the timer, wherein the second amount of time is calculated as a difference of the first amount of time and a current time divided by a positive integer;
suspend, by the hypervisor, the first virtual processor for the second amount of time;
perform, by the physical processor, operations not associated with the first virtual processor until the first virtual processor is re-started;
re-start the suspended first virtual processor after the second amount of time has elapsed and prior to the next scheduled interrupt of the timer;
generate, by the timer, the next scheduled interrupt of the timer;
identify, by the hypervisor, the next scheduled interrupt of the timer;
in response to identifying the next scheduled interrupt of the timer, suspend the first virtual processor; and
start, by the hypervisor, execution of the second virtual processor on the physical processor.

4. The system of claim 3, wherein the first virtual processor, when active, is one of a ready virtual processor, a running virtual processor, or a waiting virtual processor.

5. The system of claim 3, wherein the timer is programmable.

6. The system of claim 3, further comprising a programmable interrupt controller.

7. A computer-readable non-transitory storage medium comprising executable instructions that, when executed by a physical processor, cause the physical processor to:
identify, by a hypervisor executed by the physical processor, a first virtual processor of a virtual machine executed on the physical processor;
determine, by the hypervisor, a first amount of time remaining until a next scheduled interrupt of a timer communicatively coupled to the physical processor, wherein the first amount of time corresponds to a first share of the physical processor by the first virtual processor and the interrupt of the timer corresponds to the start of a second share of the physical processor by a second virtual processor of the virtual machine;
determine, by the hypervisor, a second amount of time for suspending the first virtual processor that is less than the first amount of time remaining until the next scheduled timer interrupt of the timer, wherein the second amount of time is calculated as a difference of the first amount of time and a current time divided by a positive integer;
suspend, by the hypervisor, the first virtual processor for the second amount of time;
perform, by the physical processor, operations not associated with the first virtual processor until the first virtual processor is re-started:
re-start, by the hypervisor, the suspended first virtual processor after the second amount of time has elapsed and prior to the next scheduled interrupt of the timer;
generate, by the timer, the next scheduled interrupt of the timer;
identify, by the hypervisor, the next scheduled interrupt of the timer;
in response to identifying the next scheduled interrupt of the timer, suspend the first virtual processor; and
start, by the hypervisor, execution of the second virtual processor on the physical processor.

8. The computer-readable non-transitory storage medium of claim 7, wherein the first virtual processor, when active, is one of a ready virtual processor, a running virtual processor, or a waiting virtual processor.

* * * * *

UNITED STATES PATENT AND TRADEMARK OFFICE
CERTIFICATE OF CORRECTION

PATENT NO. : 9,778,943 B2
APPLICATION NO. : 13/903561
DATED : October 3, 2017
INVENTOR(S) : Michael Tsirkin and Uri Lublin Page 1 of 1

It is certified that error appears in the above-identified patent and that said Letters Patent is hereby corrected as shown below:

In the Claims

In Claim 7, Column 10, Line 17, delete "the" and insert --a--

Signed and Sealed this
Twenty-sixth Day of November, 2019

Andrei Iancu
*Director of the United States Patent and Trademark Office*